United States Patent
Chen et al.

(10) Patent No.: US 11,882,604 B2
(45) Date of Patent: Jan. 23, 2024

(54) RANDOM ACCESS METHOD AND APPARATUS APPLICABLE TO SATELLITE COMMUNICATION

(71) Applicant: HUAWEI TECHNOLOGIES CO., LTD., Shenzhen (CN)

(72) Inventors: Jun Chen, Dongguan (CN); Peng Liu, Shenzhen (CN); Jingjing Huang, Shenzhen (CN); Guangjian Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 331 days.

(21) Appl. No.: 17/329,882

(22) Filed: May 25, 2021

(65) Prior Publication Data
US 2021/0282193 A1     Sep. 9, 2021

Related U.S. Application Data (63) Continuation of application No. PCT/CN2019/120199, filed on Nov. 22, 2019.

(30) Foreign Application Priority Data

Nov. 26, 2018   (CN) .......................... 201811418682.2

(51) Int. Cl.
*H04W 74/08*     (2009.01)
*H04B 7/185*     (2006.01)
(Continued)

(52) U.S. Cl.
CPC .... *H04W 74/0833* (2013.01); *H04B 7/18543* (2013.01); *H04B 7/18589* (2013.01); *H04W 56/009* (2013.01); *H04W 84/06* (2013.01)

(58) Field of Classification Search
None
See application file for complete search history.

(56) References Cited

U.S. PATENT DOCUMENTS 8,850,067 B2 *   9/2014   Ait-Ameur ........... H04L 61/503
                                                       709/224
11,546,946 B2 *  1/2023   Wei ....................... H04W 40/22
(Continued)

FOREIGN PATENT DOCUMENTS

CN             1839569 A        9/2006
CN           102595634 A        7/2012
(Continued)

OTHER PUBLICATIONS

3rd Generation Partnership Project; Technical Specification Group Radio Access Network;NR, 3GPP TS 38.213 V15.3.0, Physical layer procedures for control (Release 15), Sep. 2018, 101 pages.
(Continued)

*Primary Examiner* — Faiyazkhan Ghafoerkhan
(74) *Attorney, Agent, or Firm* — HAUPTMAN HAM, LLP (57) ABSTRACT

This application provides a random access method and apparatus applicable to satellite communication. The method includes: obtaining a round-trip transmission latency $t_{RTD}$ of a signal between a terminal device and a satellite; obtaining a random access parameter based on the $t_{RTD}$, where the random access parameter includes one or more of: a duration between a moment at which the terminal device sends a random access preamble and a moment at which the terminal device starts to receive a random access response RAR, a duration of a window in which the terminal device receives the RAR, a duration between a moment at which the terminal device stops receiving the RAR and a moment at which the terminal device sends the random
(Continued)

---

Obtain a round-trip latency $t_{RTD}$ of a signal between a terminal device UE and a satellite    — 101

Obtain a random access parameter based on the round-trip latency, where the random access parameter includes one or more of the following: $t_X$, $t_Y$, $t_{backoff}$, and $t_{subframe}$    — 102

Receive, by the UE, an RAR based on the random access parameter    — 103 access preamble again, and a subframe duration; and receiving, by the terminal device the RAR based on the random access parameter.

19 Claims, 5 Drawing Sheets

(51) Int. Cl.
*H04W 56/00* (2009.01)
*H04W 84/06* (2009.01)

(56) References Cited

U.S. PATENT DOCUMENTS

| | | | |
|---|---|---|---|
| 2017/0005741 A1* | 1/2017 | Wu | H04W 24/08 |
| 2017/0033903 A1* | 2/2017 | Xu | H04B 7/18543 |
| 2018/0254825 A1* | 9/2018 | Speidel | H04B 7/1858 |
| 2019/0199431 A1* | 6/2019 | Speidel | H04B 7/18532 |
| 2020/0244349 A1* | 7/2020 | Speidel | H04B 7/18532 |
| 2020/0413451 A1* | 12/2020 | Taherzadeh Boroujeni | H04B 7/18504 |
| 2021/0099933 A1* | 4/2021 | Matsuda | H04W 36/0072 |
| 2021/0266981 A1* | 8/2021 | Wei | H04W 72/04 |
| 2021/0282193 A1* | 9/2021 | Chen | H04W 74/0833 |
| 2022/0006515 A1* | 1/2022 | Speidel | H04B 7/18532 |
| 2022/0369374 A1* | 11/2022 | Taherzadeh Boroujeni | H04B 7/18504 |
| 2023/0070647 A1* | 3/2023 | Matsuda | H04W 48/12 |

FOREIGN PATENT DOCUMENTS

| | | |
|---|---|---|
| CN | 103004239 A | 3/2013 |
| CN | 103298136 A | 9/2013 |
| CN | 103346829 A | 10/2013 |
| CN | 105915315 A | 8/2016 |
| GB | 2461780 A | 1/2010 |
| WO | 2013041574 A1 | 3/2013 |
| WO | 2013107276 A1 | 7/2013 |

OTHER PUBLICATIONS

3rd Generation Partnership Project; Technical Specification Group Radio Access Network;NR, 3GPP TS 38.331 V15.3.0, Radio Resource Control (RRC) protocol specification (Release 15), Sep. 2018, 445 pages.
3rd Generation Partnership Project; Technical Specification Group Radio Access Network; NR, Physical channels and modulation (Release 15), 3GPP TS 38.211 V15.3.0, Sep. 2018, 96 pages.
3rd Generation Partnership Project; Technical Specification Group Radio Access Network; Evolved Universal Terrestrial Radio Access (E-UTRA), Radio Resource Control (RRC); Protocol specification(Release 15), 3GPP TS 36.331 V15.3.0, 918 pages.
Stefania Sesia et al., LTE—The UMTS Long Term Evolution: From Theory to Practice, Aug. 29, 2011, 5 pages, https://books.google.com.hk/books?hl=zh-CNandlr=andid=g0lficnQ6eUCandoi=fndandpg=PR21anddq=LTE-The+UMTS+Long+Term+Evolutionandots=rlNidwik1Zandsig=1i2prBpdbPzBoep0IKJKfumMd64andredir_esc=yandhl=zhCNandsourceid=cndr#v=onepageandq=LTEThe%20UMTS%20Long%20Term%20Evolutionandf=false.

* cited by examiner

RANDOM ACCESS METHOD AND APPARATUS APPLICABLE TO SATELLITE COMMUNICATION

CROSS-REFERENCE TO RELATED APPLICATIONS

This application is a continuation of International Application No. PCT/CN2019/120199, filed on Nov. 22, 2019, which claims priority to Chinese Patent Application No. 201811418682.2, filed on Nov. 26, 2018. The disclosures of the aforementioned applications are hereby incorporated by reference in their entireties.

TECHNICAL FIELD

This application relates to communications technologies, and in particular, to a random access method and apparatus applicable to satellite communication.

BACKGROUND

Compared with a conventional communications system, satellite communication has a wider coverage area and can overcome natural geographical obstacles such as oceans, deserts, and mountains. Therefore, the satellite communication can be used as an effective supplement to a conventional communications network. According to different orbital heights, satellite communication systems may be classified into the following three types: a geostationary earth orbit (GEO) satellite communication system, also referred to as a synchronous orbit satellite system, a medium earth orbit (MEO) satellite communication system, and a low earth orbit (LEO) satellite communication system. The orbital height of the GEO satellite communication system is 35786 km. The advantages of the GEO satellite communication system are as follows: The GEO satellite communication system is stationary relative to the ground, and provides a large coverage area. The disadvantages of the GEO satellite communication system are as follows: The distance between the GEO satellite communication system and the earth is very long, an antenna with a relatively large diameter is required, and a transmission latency is relatively long. Consequently, the GEO satellite communication system cannot meet the requirements of real-time services. The orbital height of the MEO satellite communication system ranges from 2000 km to 35786 km. The advantage of the MEO satellite communication system is that global coverage can be implemented through a relatively small quantity of satellites. The disadvantage of the MEO satellite communication system is that a transmission latency is relatively long. The orbital height of the LEO satellite communication system ranges from 300 km to 2000 km. The advantages of the LEO satellite communication system are as follows: A data transmission latency is short, and a power loss is small. Therefore, the LEO satellite communication system attracts much attention in recent years.

Currently, there are still various problems, especially random access, when an existing 5G new radio (NR) protocol is directly used in satellite communication. A random access process specified in the NR protocol includes: After sending a message Msg 1 (Preamble), user equipment (UE) starts to monitor a message Msg 2 after X time units, where the Msg 2 is a random access response (RAR). The UE can proceed with a subsequent random access process only after receiving the Msg 2 within a window with duration of Y time units. The NR protocol has requirements on both X and Y.

However, according to a round-trip transmission latency that is of a signal between the UE and a satellite and that is calculated based on the height and coverage of the satellite, and a transmission latency of a radio wave, it can be learned that UE at an edge of the satellite coverage area probably cannot receive the Msg 2 within a window specified in the protocol. Consequently, random access fails, and a requirement of satellite communication cannot be met.

SUMMARY

This application provides a random access method and apparatus applicable to satellite communication, to ensure that a moment at which an RAR arrives at UE falls within a window in which the UE receives the RAR. In this way, a success rate of random access of the UE is improved, and a requirement of satellite communication is met.

According to a first aspect, this application provides a random access method applicable to satellite communication, and the method includes:

obtaining a round-trip transmission latency $t_{RTD}$ of a signal between a terminal device UE and a satellite; obtaining a random access parameter based on the round-trip transmission latency, where the random access parameter includes one or more of the following: $t_X$, $t_Y$, $t_{backoff}$, and $t_{subframe}$, where $t_X$ represents duration between a moment at which the UE sends a random access preamble and a moment at which the UE starts to receive a random access response RAR, $t_Y$ represents duration of a window in which the UE receives the RAR, $t_{backoff}$ represents duration between a moment at which the UE stops receiving the RAR and a moment at which the UE sends the random access preamble again, and $t_{subframe}$ represents subframe duration; and receiving, by the UE, the RAR based on the random access parameter.

In this application, one or more of the random access parameters $t_X$, $t_Y$, $t_{backoff}$, and $t_{subframe}$ are obtained based on the round-trip transmission latency between the satellite and the UE, to improve a hit rate that a moment at which the RAR arrives at the UE falls within the window in which the UE receives the RAR. In this way, a success rate of random access of the UE is improved, and a requirement of satellite communication is met.

In a possible implementation, the obtaining a round-trip transmission latency of a signal between UE and a satellite specifically includes: obtaining a parameter used to calculate the round-trip transmission latency between the UE and the satellite, where the parameter includes orbital height information of the satellite, ephemeris information of the satellite, and position information of the UE; and calculating the round-trip transmission latency based on the parameter of the round-trip transmission latency.

In a possible implementation, the random access parameter includes $t_X$ and $t_Y$, and $t_X$ and/or $t_Y$ meet/meets the following condition:

$$t_X < t_{RTD} < t_X + t_Y.$$

In a possible implementation, the random access parameter includes $t_X$, $t_Y$, and/or $t_{backoff}$, and $t_X$, $t_Y$, and $t_{backoff}$ meet the following condition:

$$(k+1)(t_X + t_{backoff}) + k(t_Y) < t_{RTD} < (k+1)(t_X + t_{backoff} + t_Y),$$
where k represents that the UE receives the random access response for the $k^{th}$ time, and $$k = \left\lfloor \frac{t_{RTD}}{t_X + t_Y + t_{backoff}} \right\rfloor.$$

In a possible implementation, the random access parameter includes $t_{subframe}$, and $t_{subframe}$ meets the following condition:

$$t_X \times t_{subframe} \leq (\min(t_{RTD}), \max(t_{RTD})) \leq (t_X + t_Y) \times t_{subframe}.$$

In a possible implementation, the random access parameter further includes a quantity m of retransmission times of the random access response and a retransmission time interval n of the random access response, and m and n meet the following condition:

$$2(t_X + t_Y) + t_{backoff} \leq m \times n + t_{RTD} + X \leq 2(t_X + t_Y + t_{backoff}),$$
where X represents duration between a moment at which the satellite receives the preamble and a moment at which the satellite sends the RAR.

According to a second aspect, this application provides a random access apparatus applicable to satellite communication, and the apparatus includes:

a latency obtaining module, configured to obtain a round-trip transmission latency $t_{RTD}$ of a signal between a terminal device UE and a satellite;

a parameter obtaining module, configured to obtain a random access parameter based on the round-trip transmission latency, where the random access parameter includes one or more of the following: $t_X$, $t_Y$, $t_{backoff}$, and $t_{subframe}$, where $t_X$ represents duration between a moment at which the UE sends a random access preamble and a moment at which the UE starts to receive a random access response RAR, $t_Y$ represents duration of a window in which the UE receives the RAR, $t_{backoff}$ represents duration between a moment at which the UE stops receiving the RAR and a moment at which the UE sends the random access preamble again, and $t_{subframe}$ represents subframe duration; and a receiving module, configured to receive, by the UE, the RAR based on the random access parameter.

In this application, one or more of the random access parameters $t_X$, $t_Y$, $t_{backoff}$, and $t_{subframe}$ are obtained based on the round-trip transmission latency between the satellite and the UE, to improve a hit rate that a moment at which the RAR arrives at the UE falls within the window in which the UE receives the RAR. In this way, a success rate of random access of the UE is improved, and a requirement of satellite communication is met.

In a possible implementation, the latency obtaining module is specifically configured to: obtain a parameter used to calculate the round-trip transmission latency between the UE and the satellite, where the parameter includes orbital height information of the satellite, ephemeris information of the satellite, and position information of the UE; and calculate the round-trip transmission latency based on the parameter of the round-trip transmission latency.

In a possible implementation, the random access parameter includes $t_X$ and $t_Y$, and $t_X$ and/or $t_Y$ meet/meets the following condition:

$$t_X \leq t_{RTD} \leq t_X + t_Y.$$

In a possible implementation, the random access parameter includes $t_X$, $t_Y$, and/or $t_{backoff}$, and $t_X$, $t_Y$, and $t_{backoff}$ meet the following condition:

$$(k+1)(t_X + t_{backoff}) + k(t_Y) \leq t_{RTD} \leq (k+1)(t_X + t_{backoff} + t_Y),$$
where k represents that the UE receives the random access response for the $k^{th}$ time, and $$k = \left\lfloor \frac{t_{RTD}}{t_X + t_Y + t_{backoff}} \right\rfloor.$$

In a possible implementation, the random access parameter includes $t_{subframe}$, and $t_{subframe}$ meets the following condition:

$$t_X \times t_{subframe} \leq (\min(t_{RTD}), \max(t_{RTD})) \leq (t_X + t_Y) \times t_{subframe}.$$

In a possible implementation, the random access parameter further includes a quantity m of retransmission times of the random access response and a retransmission time interval n of the random access response, and m and n meet the following condition:

$$2(t_X + t_Y) + t_{backoff} \leq m \times n + t_{RTD} + X \leq 2(t_X + t_Y + t_{backoff}),$$
where X represents duration between a moment at which the satellite receives the preamble and a moment at which the satellite sends the RAR.

According to a third aspect, this application provides a communications device, including:

one or more processors; and a memory, configured to store one or more programs.

When the one or more programs are executed by the one or more processors, the one or more processors are enabled to implement any random access method applicable to satellite communication in the first aspect.

According to a fourth aspect, this application provides a computer-readable storage medium. The computer-readable storage medium stores instructions, and when the instructions are run on a computer, the instructions are used to perform any random access method applicable to satellite communication in the first aspect.

According to a fifth aspect, this application provides a computer program. When the computer program is executed by a computer, the computer program is used to perform any random access method applicable to satellite communication in the first aspect.

DESCRIPTION OF EMBODIMENTS

To make objectives, technical solutions, and advantages of this application clearer, the following clearly describes the technical solutions in this application with reference to the accompanying drawings in this application. Definitely, the described embodiments are merely a part rather than all of the embodiments of this application. All other embodiments obtained by a person of ordinary skill in the art based on the embodiments of this application without creative efforts shall fall within the protection scope of this application.

Figure 1:
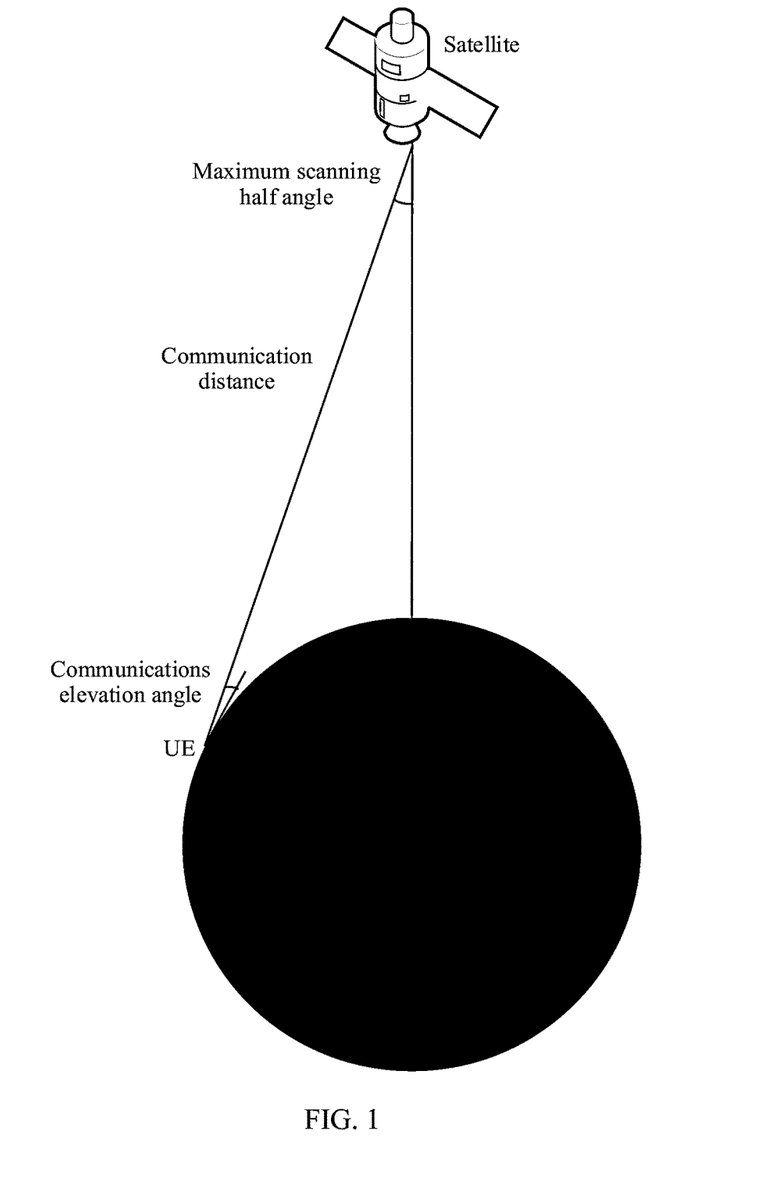
FIG. 1 is a schematic diagram of a satellite communication scenario according to this application.

FIG. 1 is a schematic diagram of a satellite communication scenario according to this application. As shown in FIG. 1, a satellite in the air communicates with UE on the ground. A protocol used by the satellite is a protocol stack compatible with a long term evolution (LTE) protocol or an NR protocol. The UE is a common mobile terminal or a dedicated terminal, and a communication process between the satellite and the UE complies with the LTE protocol or the NR protocol. Because a communication distance between the satellite and the UE is far greater than a communication distance between the UE and a base station in the NR protocol, a round-trip transmission latency of a signal between the UE and the satellite is longer. Especially, a communication distance between UE at an edge of the satellite coverage area and the satellite is farther. To ensure that the UE receives an RAR within a window specified in the protocol, this application provides a random access method applicable to satellite communication.

Figure 2:
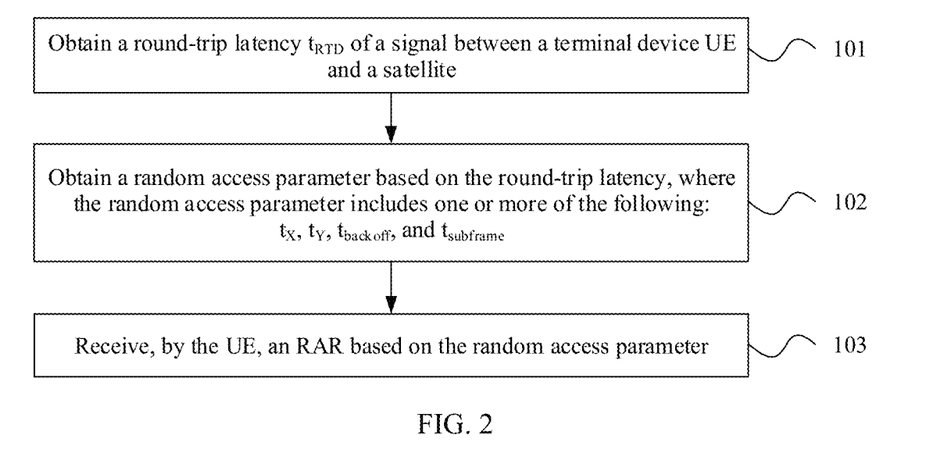
FIG. 2 is a flowchart of an embodiment of a random access method applicable to satellite communication according to this application.

FIG. 2 is a flowchart of an embodiment 1 of a random access method applicable to satellite communication according to this application. As shown in FIG. 2, the method in this embodiment may include the following steps.

Step 101. Obtain a round-trip transmission latency $t_{RTD}$ of a signal between a terminal device UE and a satellite.

The round-trip transmission latency $t_{RTD}$ of the signal between the terminal device UE and the satellite depends on some parameters of the satellite and the UE. These parameters include orbital height information of the satellite, ephemeris information of the satellite, and position information of the UE. A distance d between the satellite and the UE may be obtained based on the orbital height information of the satellite, the ephemeris information of the satellite, and the position information of the UE, and then the round-trip transmission latency may be obtained based on a relationship between the distance and a speed. The round-trip transmission latency may be calculated by using the following formula:

$$t_{RTD} = \frac{2d}{c},$$

where c indicates a propagation velocity of a radio wave in the air. Usually, c is 299792.458 km/s. Because the round-trip transmission latency of the signal between the satellite and the UE is calculated, twice the distance d is used.

Step 102. Obtain a random access parameter based on the round-trip transmission latency, where the random access parameter includes one or more of the following: $t_X$, $t_Y$, $t_{backoff}$, and $t_{subframe}$.

Figure 3:
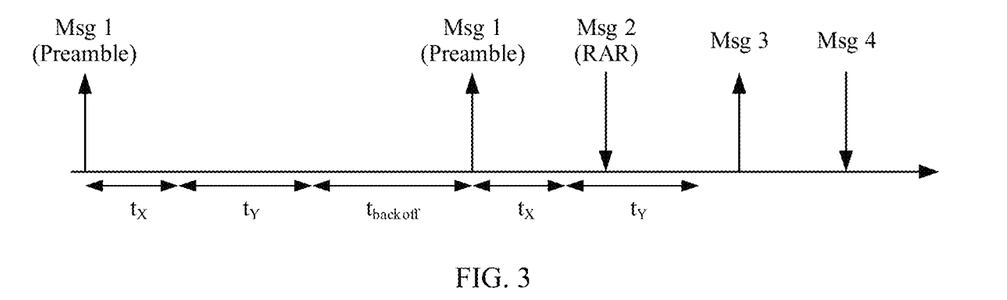
FIG. 3 is a schematic diagram of a time sequence of UE in a random access process according to this application.

FIG. 3 is a schematic diagram of a time sequence of UE in a random access process according to this application. As shown in FIG. 3, $t_X$ represents duration between a moment at which the UE sends a random access preamble and a moment at which the UE starts to receive an RAR, $t_Y$ represents duration of a window in which the UE receives the RAR, and $t_{backoff}$ represents duration between a moment at which the UE stops receiving the RAR and a moment at which the UE sends the random access preamble again. The UE initiates random access to the satellite and first sends a Msg 1 (namely, preamble) to the satellite. From this moment, after the duration $t_X$, the UE starts to attempt to receive a Msg 2 (namely, RAR). The duration of the window in which the UE receives the RAR is $t_Y$. Because the UE still does not receive the RAR after the duration $t_{backoff}$, the UE sends the preamble again. The UE finally receives the RAR within a second RAR receiving window after the duration $t_X$. Then, the UE may send a Msg 3 (namely, a predetermined transmission message) to the satellite based on a standard random access process, and receive a Msg 4 (namely, a contention resolution message) sent by the satellite.

Because message processing performed by the satellite on the UE is strictly specified in the protocol, and the time is known and controllable, the moment at which the UE receives the RAR is finally determined by the round-trip transmission latency of the signal between the satellite and the UE. To enable the UE to receive the RAR as soon as possible, it is necessary to ensure that the moment when the RAR arrives at the UE falls within the window in which the UE receives the RAR. This application provides, based on the foregoing method, a method for obtaining one or more of the random access parameters $t_X$, $t_Y$, and $t_{backoff}$ based on the round-trip transmission latency, to change the window in which the UE receives the RAR. As shown in FIG. 3, changing of one or more parameters of $t_X$, $t_Y$, and $t_{backoff}$ may change the window in which the UE receives the RAR, including changing of a start moment or total duration of the window, a start moment of a next window, or the like. The random access parameter changes based on an actual communication scenario of the satellite and the UE, to improve a hit rate that a moment at which the RAR arrives at the UE falls within the window in which the UE receives the RAR. In this way, a success rate of random access of the UE is improved, and a requirement of satellite communication is met.

In addition, this application further provides a method for obtaining $t_{subframe}$ based on the round-trip transmission latency. Units of $t_X$, $t_Y$, and $t_{backoff}$ are all subframes. Duration of one subframe in an existing protocol is usually 1 ms, and duration corresponding to $t_X$, $t_Y$, and $t_{backoff}$ may also change by changing the duration of the subframe, to achieve the same technical effect. Because a value of $t_{subframe}$ is specified in the protocol, an objective of this application is to calculate a modifiable value of $t_{subframe}$ based on $t_{RTD}$, and use the value as a modification suggestion for the parameter.

Step 103. The UE receives the RAR based on the random access parameter.

The applicable random access parameter between the satellite and the UE may be obtained by using the method in steps 101 and 102, and the UE may perform an operation of receiving the RAR based on the random access parameter.

In this application, one or more of the random access parameters $t_X$, $t_Y$, $t_{backoff}$, and $t_{subframe}$ are obtained based on the round-trip transmission latency between the satellite and the UE, to improve a hit rate that a moment at which the RAR arrives at the UE falls within the window in which the UE receives the RAR. In this way, a success rate of random access of the UE is improved, and a requirement of satellite communication is met.

The technical solution in the method embodiment shown in FIG. 2 is described in detail below by using several specific embodiments.

1. Change $t_Y$

The unit of $t_{RTD}$ calculated by using the foregoing formula is second. According to a protocol, expression modes of duration may be classified into the following three types. Therefore, the unit of $t_{RTD}$ needs to be unified with an expression mode of duration in a system.

(1) If the duration uses a subframe (1 ms) as a unit, a value of $t_Y$ may be obtained according to $t_{RTD} \times 1000$ or $\lceil t_{RTD} \times 1000 \rceil$.

(2) If the duration uses a symbol as a unit, a value of $t_Y$ may be obtained according to $t_{RTD} \times (2^\mu \times 14000)$ or $\lceil t_{RTD} \times (2^\mu \times 14000) \rceil$.

(3) If the duration uses a slot $T_c$ as a unit, a value of $t_Y$ may be obtained according to $t_{RTD}/T_c$ or $\lceil t_{RTD}/T_c \rceil$.

It should be noted that, if various parameters in a unit of second (s) or millisecond (ms) in this application need to be represented in a unit of a subframe, a symbol, or a slot, similar processing may be performed by using the foregoing method. Details are not described again.

In this embodiment, a probability that the UE receives the RAR is increased by merely considering changing (especially prolonging) duration of the window in which the UE receives the RAR. Therefore, the round-trip transmission latency of the signal between the satellite and the UE may be used as a reference for changing the duration of the window. As the satellite moves, the round-trip transmission latency changes within a specific range, and duration of a corresponding window may obtain a configurable range. Within the range, it may be considered that a hit rate that a moment at which the RAR arrives at the UE falls within the window at which the UE receives the RAR meets a requirement of satellite communications.

2. Change $t_X$ and/or $t_Y$ $t_X$ and/or $t_Y$ meet the following condition:

$$t_X \leq t_{RTD} \leq t_X + t_Y.$$

In this embodiment, $t_X$ and $t_Y$ may change at the same time, or either of $t_X$ and $t_Y$ may change. For example, if $t_{RTD}$ is 13 ms and $t_Y$ remains 10 ms, a value range of $t_X$ may be 4 ms to 12 ms (preferably 4 ms). For another example, if $t_{RTD}$ is 13 ms and $t_X$ remains 4 ms, a value range of $t_Y$ may be greater than 10 ms (preferably 10 ms).

3. Change $t_X$, $t_Y$, and/or $t_{backoff}$ $t_X$, $t_Y$, and/or $t_{backoff}$ meet the following condition:

$$(k+1)(t_X+t_{backoff})+k(t_Y) \leq t_{RTD} \leq (k+1)(t_X+t_{backoff}+t_Y),$$

where k represents that the UE receives the random access response for the $k^{th}$ time, and $$k = \left\lfloor \frac{t_{RTD}}{t_X + t_Y + t_{backoff}} \right\rfloor.$$

In this embodiment, $t_X$, $t_Y$, and $t_{backoff}$ may change at the same time, or only one of $t_X$, $t_Y$, and $t_{backoff}$ may change. For example, if $t_{RTD}$ is 16 ms and $t_X$ remains 1 ms, $t_Y$ may be set to 5 ms, and $t_{backoff}$ may be set to 3 ms. In this way, the UE may receive the RAR in the second (k is 1) RAR receiving window.

4. Change $t_{subframe}$ $t_{subframe}$ meets the following condition:

$$t_X \times t_{subframe} \leq (\min(t_{RTD}), \max(t_{RTD})) \leq (t_X+t_Y) \times t_{subframe}.$$

In this embodiment, only $t_{subframe}$ may change, so as to change duration corresponding to $t_X$, $t_Y$, and $t_{backoff}$ or $t_X$, $t_Y$, $t_{backoff}$, and $t_{subframe}$ may change at the same time. For example, $t_{subframe}$ changes to 2 ms or 3 ms, so that duration corresponding to $t_X$, $t_Y$, and $t_{backoff}$ is increased. If increased or decreased changes are made for $t_X$, $t_Y$, and $t_{backoff}$, a hit rate that a moment at which the RAR arrives at the UE falls within the window in which the UE receives the RAR is increased. In this way, a success rate of random access of the UE is improved, and a requirement of satellite communication is met.

5. Change a Quantity of RAR Retransmission Times.

Figure 4:
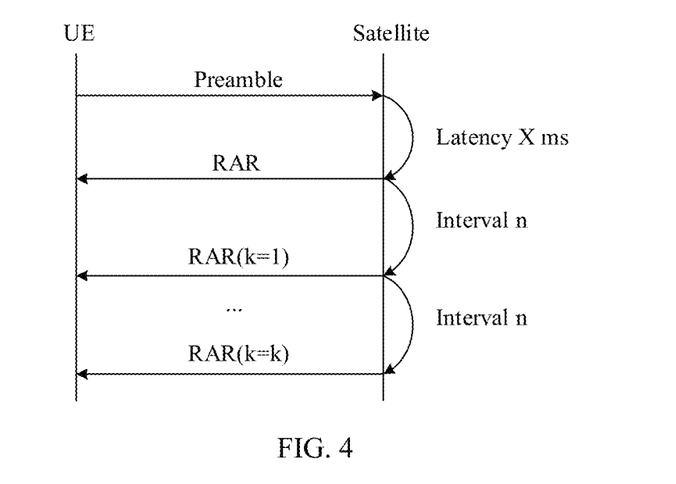
FIG. 4 is a flowchart of an embodiment 1 of a plurality of RAR retransmission times according to this application.

FIG. 4 is a flowchart of an embodiment 1 of a plurality of RAR retransmission times according to this application. As shown in FIG. 4, UE sends a preamble to a satellite, and after receiving the preamble, the satellite sends an RAR to the UE after a time length (for example, X ms) of several slots. If the satellite does not receive a Msg 3 sent by the UE, the RAR is retransmitted. A quantity m of retransmission times and a retransmission interval n meet the following conditions:

$$2(t_X+t_Y)+t_{backoff} \leq m \times n+t_{RTD}+X \leq 2(t_X+t_Y+t_{backoff}),$$

where

X represents duration between a moment at which the satellite receives the preamble and a moment at which the satellite sends the RAR.

If the Msg 3 is received during the retransmission, the satellite stops sending the RAR to the UE. If the Msg 3 is still not received after m retransmission times, the satellite also stops sending the RAR to the UE. In this case, the UE may need to re-initiate a new random access process.

Figure 5:
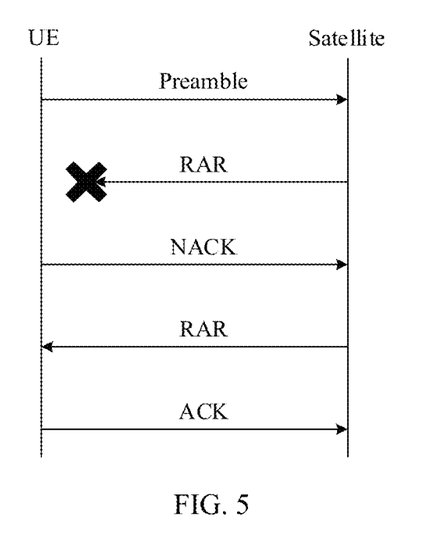
FIG. 5 is a flowchart of an embodiment 2 of a plurality of RAR retransmission times according to this application.

FIG. 5 is a flowchart of an embodiment 2 of a plurality of RAR retransmission times according to this application. As shown in FIG. 5, during RAR retransmission, a satellite may also determine, based on hybrid automatic repeat request (HARQ) information fed back by UE, whether the RAR retransmission needs to be performed. That is, after the satellite sends the RAR, if a negative acknowledgment (NACK) sent by the UE is received, the satellite retransmits the RAR. If an acknowledgment (ACK) sent by the UE is received, the satellite stops sending the RAR.

The foregoing five embodiments may be executed by the satellite. After obtaining a related random access parameter, the satellite may notify the UE in a broadcast manner. In this way, in a random access process, the UE may receive the RAR by using the random access parameter notified by the satellite, to improve a hit rate that a moment at which the RAR arrives at the UE falls within a window in which the UE receives the RAR. In this way, a success rate of random access of the UE is improved, and a requirement of satellite communication is met.

The foregoing five embodiments may also be executed by the UE. Because the satellite faces a large quantity of UEs, a change made by the satellite to the random access parameter usually is to provide a range, and a precise value of a related parameter needs to be determined by the UE with reference to a situation of the UE.

Figure 6:
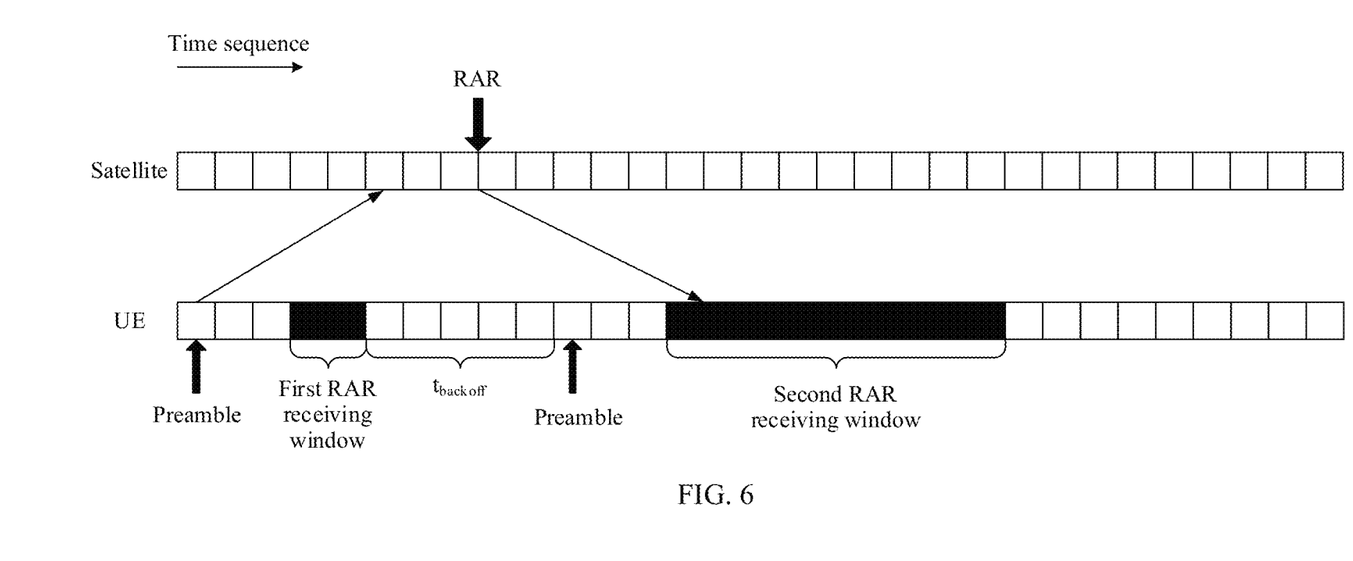
FIG. 6 is a schematic diagram of a time sequence in which UE receives an RAR according to this application.

Preferably, FIG. 6 is a schematic diagram of a time sequence in which UE receives an RAR according to this application. As shown in FIG. 6, for $t_{backoff}$, after passing through an RAR receiving window, the UE knows whether the RAR is received this time. Therefore, $t_{backoff}$ may also quickly change based on a receiving result, to ensure that the RAR is received in a next RAR receiving window. For example, if the UE does not receive the RAR in an initial random access cycle, the UE actively shortens duration and/or $t_{backoff}$ of a first RAR receiving window, and adjusts a second RAR receiving window, including a start moment and/or duration of the window, so that the RAR can be received within the window. In this way, the UE may abandon, in a timely manner, the first window in which the RAR cannot be received, and place the target in the second window, to improve a hit rate that a moment at which the RAR arrives at the UE falls within the second window, and receive the RAR in a fastest manner.

Figure 7:
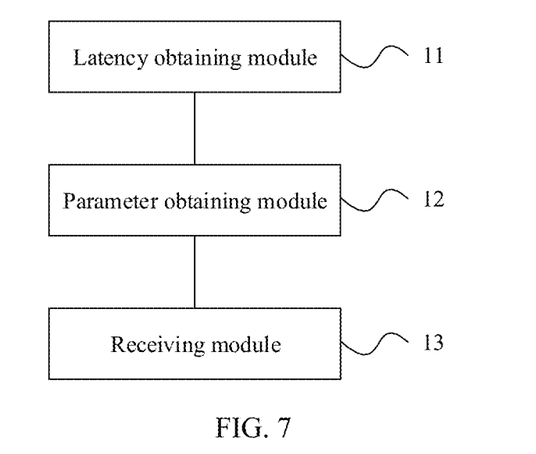
FIG. 7 is a schematic structural diagram of an embodiment of a random access apparatus applicable to satellite communication according to this application.

FIG. 7 is a schematic structural diagram of an embodiment of a random access apparatus applicable to satellite communication according to this application. As shown in FIG. 7, the apparatus of this application may include a latency obtaining module 11, a parameter obtaining module 12, and a receiving module 13. The latency obtaining module 11 is configured to obtain a round-trip transmission latency $t_{RTD}$ of a signal between a terminal device UE and a satellite. The parameter obtaining module 12 is configured to obtain a random access parameter based on the round-trip transmission latency. The random access parameter includes one or more of the following: $t_X$, $t_Y$, $t_{backoff}$, and $t_{subframe}$, where $t_X$ represents duration between a moment at which the UE sends a random access preamble and a moment at which the UE starts to receive a random access response RAR, $t_Y$ represents duration of a window in which the UE receives the RAR, $t_{backoff}$ represents duration between a moment at which the UE stops receiving the RAR and a moment at which the UE sends the random access preamble again, and $t_{subframe}$ represents subframe duration. The receiving module 13 is configured to receive the RAR based on the random access parameter.

Based on the foregoing technical solution, the latency obtaining module 11 is specifically configured to: obtain a parameter used to calculate the round-trip transmission latency between the UE and the satellite, where the parameter includes orbital height information of the satellite, ephemeris information of the satellite, and position information of the UE; and calculate the round-trip transmission latency based on the parameter of the round-trip transmission latency.

In a possible implementation, the random access parameter includes $t_X$ and $t_Y$, and $t_X$ and/or $t_Y$ meet/meets the following condition:

$$t_X \leq t_{RTD} \leq t_X + t_Y.$$

In a possible implementation, the random access parameter includes $t_X$, $t_Y$, and/or $t_{backoff}$, and $t_X$, $t_Y$, and $t_{backoff}$ meet the following condition:

$$(k+1)(t_X+t_{backoff})+k(t_Y) \leq t_{RTD} \leq (k+1)(t_X+t_{backoff}+t_Y),$$

where k represents that the UE receives the random access response for the $k^{th}$ time, and $$k = \left\lfloor \frac{t_{RTD}}{t_X + t_Y + t_{backoff}} \right\rfloor.$$

In a possible implementation, the random access parameter includes $t_{subframe}$, and $t_{subframe}$ meets the following condition:

$$t_X \times t_{subframe} \leq (\min(t_{RTD}), \max(t_{RTD})) \leq (t_X \times t_Y) \times t_{subframe}.$$

In a possible implementation, the random access parameter further includes m retransmission times of the random access response and a retransmission time interval n of the random access response, and the m and the n meet the following condition:

$$2(t_X+t_Y)+t_{backoff} \leq m \times n+t_{RTD}+X \leq 2(t_X+t_Y+t_{backoff}).$$

The apparatus provided in FIG. 7 corresponds to the foregoing embodiment of the random access method applicable to satellite communication in the foregoing embodiment. Corresponding units of the apparatus in FIG. 7 are respectively configured to perform the method or corresponding steps and/or procedures of the method in the embodiments.

Figure 8:
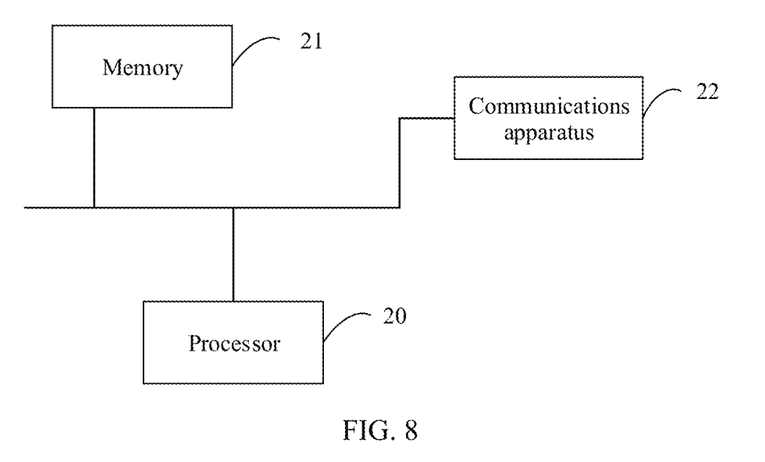
FIG. 8 is a schematic structural diagram of an embodiment of a communications device according to this application.

FIG. 8 is a schematic structural diagram of an embodiment of a communications device according to this application. As shown in FIG. 8, the communications device includes a processor 20, a memory 21, and a communications apparatus 22. There may be one or more processors 20 in the communications device. In FIG. 8, one processor 20 is used as an example. The processor 20, the memory 21, and the communications apparatus 22 in the communications device may be connected by using a bus or in another manner. In FIG. 8, an example in which the processor 20, the memory 21, and the communications apparatus 22 are connected by using a bus is used.

As a computer-readable storage medium, the memory 21 may be configured to store a software program, a computer-executable program, and a module, for example, program instructions/module corresponding to the embodiment of this application. The processor 20 runs the software program, instructions, and the module that are stored in the memory 21, to perform various function applications and data processing of the communications device, for example, perform the foregoing random access method applicable to satellite communication.

The memory 21 may mainly include a program storage area and a data storage area. The program storage area may store an operating system and an application program required by at least one function. The data storage area may store data created based on use of a terminal, and the like. In addition, the memory 21 may include a high-speed random access memory, and may further include a non-volatile memory, for example, at least one magnetic disk storage device, a flash storage device, or another non-volatile solid-state storage device. In some examples, the memory 21 may further include memories that are remotely disposed relative to the processor 20, and these remote memories may be connected to the communications device through a network. Examples of the foregoing network include but are not limited to the internet, an intranet, a local area network, a mobile communications network, and a combination thereof.

The communications apparatus 22 may be configured to receive or send a signal carrying signaling, a message, and data.

The memory 21 may also be integrated with the processor 20, and may also be independent of the processor 20.

In a possible implementation, this application provides a computer-readable storage medium. The computer-readable storage medium stores instructions, and when the instructions are run on a computer, the instructions are used to perform the random access method applicable to satellite communication in the foregoing embodiment.

In a possible implementation, this application provides a computer program. When the computer program is executed by a computer, the computer program is used to perform the random access method applicable to satellite communication in the foregoing embodiment.

In a possible implementation, this application provides a chip. The chip includes a memory and a processor. The memory is configured to store a computer program, and the processor is configured to invoke the computer program from the memory and run the computer program, so that the processor performs the random access method applicable to satellite communication in the foregoing embodiment.

A person of ordinary skill in the art may understand that all or some of the steps in the foregoing method embodiments may be implemented by program-instructing related hardware. The foregoing program may be stored in a computer-readable storage medium. When the program is executed, the steps in the foregoing method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A random access method applicable to satellite communication, the method comprising:
obtaining a round-trip transmission latency ($t_{RTD}$) of a signal between a terminal device and a satellite;
obtaining a random access parameter based on the round-trip transmission latency, wherein the random access parameter comprises at least one of $t_X$, $t_Y$, $t_{backoff}$, or $t_{subframe}$, wherein
$t_X$ represents a duration between a moment at which the terminal device sends a random access preamble to the satellite and a moment at which the terminal device starts to receive a random access response (RAR) from the satellite,
$t_Y$ represents a duration of a window in which the terminal device receives the RAR,
$t_{backoff}$ represents a duration between a moment at which the terminal device stops receiving the RAR and a moment at which the terminal device sends the random access preamble again, and
$t_{subframe}$ represents a subframe duration; and
receiving, by the terminal device, the RAR from the satellite based on the random access parameter,
wherein the obtaining the round-trip transmission latency comprises:
obtaining a parameter used to calculate the round-trip transmission latency between the terminal device and the satellite, wherein the parameter comprises orbital height information of the satellite, ephemeris information of the satellite, and position information of the terminal device; and
calculating the round-trip transmission latency based on the parameter.

2. The method according to claim 1, wherein the random access parameter comprises $t_X$ and $t_Y$, and $t_X$ and $t_Y$ meet the following condition:

$$t_X < t_{RTD} < t_X + t_Y.$$

3. The method according to claim 1, wherein the random access parameter comprises $t_X$, $t_Y$, and $t_{backoff}$, and $t_X$, $t_Y$, and $t_{backoff}$ meet the following condition:

$$(k+1)(t_X + t_{backoff}) + k(t_Y) \leq t_{RTD} \leq (k+1)(t_X + t_{backoff} + t_Y),$$

wherein k represents that the terminal device receives the RAR for the $k^{th}$ time, and $$k = \left\lfloor \frac{t_{RTD}}{t_X + t_Y + t_{backoff}} \right\rfloor.$$

4. The method according to claim 1, wherein the random access parameter comprises $t_{subframe}$, and $t_{subframe}$ meets the following condition:

$$t_X \times X \, t_{subframe} \leq (\min(t_{RTD}), \max(t_{RTD})) \leq (t_X + t_Y) \times t_{subframe}.$$

5. The method according to claim 1, wherein the random access parameter further comprises a quantity m of retransmission times of the RAR and a retransmission time interval n of the RAR, and m and n meet the following condition:

$$2(t_X + t_Y) + t_{backoff} \leq m \times n + t_{RTD} + X \leq 2(t_X + t_Y + t_{backoff}),$$

wherein X represents a duration between a moment at which the satellite receives the preamble and a moment at which the satellite sends the RAR.

6. The method according to claim 1, further comprising:
in response to not receiving the RAR in a first random access cycle, adjusting, in a subsequent second access cycle, the window in which the terminal device receives the RAR by adjusting at least one of $t_Y$ or the moment at which the terminal device starts to receive the RAR.

7. The method according to claim 1, further comprising:
in response to not receiving the RAR in a first random access cycle, actively shortening, in the first random access cycle, at least one of $t_Y$ or $t_{backoff}$.

8. A communications device, comprising:
a communications apparatus configured to communicate with a satellite; and
at least one processor coupled to the communications apparatus, and configured to:
obtain a round-trip transmission latency ($t_{RTD}$) of a signal between the communications apparatus and the satellite, and
obtain a random access parameter based on the round-trip transmission latency, wherein the random access parameter comprises at least one of $t_X$, $t_Y$, $t_{backoff}$, or $t_{subframe}$, wherein
$t_X$ represents a duration between a moment at which the communications apparatus sends a random access preamble to the satellite and a moment at which the communications apparatus starts to receive a random access response (RAR) from the satellite,
$t_Y$ represents a duration of a window in which the communications apparatus receives the RAR,
$t_{backoff}$ represents a duration between a moment at which the communications apparatus stops receiving the RAR and a moment at which the communications apparatus sends the random access preamble again, and
$t_{subframe}$ represents a subframe duration,
wherein the communications apparatus is configured to receive the RAR based on the random access parameter, and
wherein, in response to the communications apparatus not receiving the RAR in a first random access cycle, the at least one processor is configured to actively shorten, in the first random access cycle, at least one of $t_Y$ or $t_{backoff}$.

9. The communications device according to claim 8, wherein the at least one processor configured to:

obtain a parameter used to calculate the round-trip transmission latency between the communications apparatus and the satellite, wherein the parameter comprises orbital height information of the satellite, ephemeris information of the satellite, and position information of the terminal device, and calculate the round-trip transmission latency based on the parameter.

10. The communications device according to claim 8, wherein the random access parameter comprises $t_X$ and $t_Y$, and $t_X$ and $t_Y$ meet the following condition:

$$t_X < t_{RTD} < t_X + t_Y.$$

11. The communications device according to claim 8, wherein the random access parameter comprises $t_X$, $t_Y$, and $t_{backoff}$, and $t_X$, $t_Y$, and $t_{backoff}$ meet the following condition:

$$(k+1)(t_X + t_{backoff}) + k(t_Y) < t_{RTD} < (k+1)(t_X + t_{backoff} + t_Y),$$

wherein k represents that the communications apparatus receives the RAR for the $k^{th}$ time, and $$k = \left\lfloor \frac{t_{RTD}}{t_X + t_Y + t_{backoff}} \right\rfloor.$$

12. The communications device according to claim 8, wherein the random access parameter comprises $t_{subframe}$, and $t_{subframe}$ meets the following condition:

$$t_X \times t_{subframe} < (\min(t_{RTD}), \max(t_{RTD})) < (t_X + t_Y) \times t_{subframe}.$$

13. The communications device according to claim 8, wherein the random access parameter further comprises a quantity m of retransmission times of the RAR and a retransmission time interval n of the RAR, and m and n meet the following condition:

$$2(t_X + t_Y) + t_{backoff} < m \times n + t_{RTD} + X < 2(t_X + t_Y + t_{backoff}),$$

wherein X represents a duration between a moment at which the satellite receives the preamble and a moment at which the satellite sends the RAR.

14. A non-transitory computer-readable storage medium, wherein the non-transitory computer-readable storage medium stores instructions, and when the instructions are executed by a computer, the instructions cause the computer to perform:

obtaining a round-trip transmission latency ($t_{RTD}$) of a signal between the computer and a satellite;

obtaining a random access parameter based on the round-trip transmission latency, wherein the random access parameter comprises at least one of $t_X$, $t_Y$, $t_{backoff}$, or $t_{subframe}$, wherein $t_X$ represent a duration between a moment at which the computer sends a random access preamble to the satellite and a moment at which the computer starts to receive a random access response (RAR) from the satellite, $t_Y$ represents a duration of a window in which the computer receives the RAR, $t_{backoff}$ represents a duration between a moment at which the computer stops receiving the RAR and a moment at which the computer sends the random access preamble again, and $t_{subframe}$ represents a subframe duration; and receiving the RAR based on the random access parameter, wherein the obtaining the random access parameter comprises one of following a) to d):

a) the random access parameter comprises $t_X$ and $t_Y$, and $t_X$ and $t_Y$ meet the following condition:

$$t_X < t_{RTD} < t_X + t_Y,$$

b) the random access parameter comprises $t_X$, $t_Y$, and $t_{backoff}$, $t_{backoff}$ and $t_X$, $t_Y$, and meet the following condition:

$$(k+1)(t_X + t_{backoff}) + k(t_Y) < t_{RTD} < (k+1)(t_X + t_{backoff} + t_Y),$$

wherein k represents that the computer receives the RAR for the $k^{th}$ time, and $$k = \left\lfloor \frac{t_{RTD}}{t_X + t_Y + t_{backoff}} \right\rfloor,$$

c) the random access parameter comprises $t_{subframe}$, and $t_{subframe}$ meets the following condition:

$$t_X \times t_{subframe} < (\min(t_{RTD}), \max(t_{RTD})) < (t_X + t_Y) \times t_{subframe},$$
and d) the random access parameter further comprises a quantity m of retransmission times of the RAR and a retransmission time interval n of the RAR, and m and n meet the following condition:

$$2(t_X + t_Y) + t_{backoff} < m \times n + t_{RTD} + X < 2(t_X + t_Y + t_{backoff}),$$

wherein X represents a duration between a moment at which the satellite receives the preamble and a moment at which the satellite sends the RAR.

15. The non-transitory computer-readable storage medium according to claim 14, wherein the obtaining the round-trip transmission latency comprises:

obtaining a parameter used to calculate the round-trip transmission latency between the computer and the satellite, wherein the parameter comprises orbital height information of the satellite, ephemeris information of the satellite, and position information of the computer; and calculating the round-trip transmission latency based on the parameter.

16. The non-transitory computer-readable storage medium according to claim 14, wherein the obtaining the random access parameter comprises:

a) the random access parameter comprises $t_X$ and $t_Y$, and $t_X$ and $t_Y$ meet the following condition:

$$t_X < t_{RTD} < t_X + t_Y.$$

17. The non-transitory computer-readable storage medium according to claim 14, wherein the obtaining the random access parameter comprises:

b) the random access parameter comprises $t_X$, $t_Y$, $t_{backoff}$, and $t_X$, $t_Y$, and $t_{backoff}$ meet the following condition:

$$(k+1)(t_X + t_{backoff}) + k(t_Y) < t_{RTD} < (k+1)(t_X + t_{backoff} + t_Y),$$

wherein k represents that the computer receives the RAR for the $k^{th}$ time, and $$k = \left\lfloor \frac{t_{RTD}}{t_X + t_Y + t_{backoff}} \right\rfloor.$$

18. The non-transitory computer-readable storage medium according to claim 14, wherein the obtaining the random access parameter comprises:

c) the random access parameter comprises $t_{subframe}$, and $t_{subframe}$ meets the following condition:

$$t_X \times t_{subframe} < (\min(t_{RTD}), \max(t_{RTD})) < (t_X + t_Y) \times t_{subframe}.$$

19. The non-transitory computer-readable storage medium according to claim 14, wherein the obtaining the random access parameter comprises:

d) the random access parameter further comprises a quantity m of retransmission times of the RAR and a retransmission time interval n of the RAR, and m and n meet the following condition:

$$2(t_X + t_Y) + t_{backoff} < m \times n + t_{RTD} + X < 2(t_X + t_Y + t_{backoff}),$$

wherein X represents a duration between a moment at which the satellite receives the preamble and a moment at which the satellite sends the RAR.

* * * * *

UNITED STATES PATENT AND TRADEMARK OFFICE
CERTIFICATE OF CORRECTION

PATENT NO.         : 11,882,604 B2
APPLICATION NO.    : 17/329882
DATED              : January 23, 2024
INVENTOR(S)        : Jun Chen et al.

It is certified that error appears in the above-identified patent and that said Letters Patent is hereby corrected as shown below:

In the Specification

Column 9, Line 55-60 should be replaced with paragraph below:
In a possible implementation, the random access parameter includes tsubframe, and tsubframe meets the following condition:
$t_X \times t_{subframe} < (\min(t_{RTD}), \max(t_{RTD})) < (t_X + t_Y) \times t_{subframe}$.

In the Claims

Claim 4 should be replaced with the following paragraph:
The method according to claim 1, wherein the random access parameter comprises tsubframe, and tsubframe meets the following condition:
$t_X \times t_{subframe} < (min(t_{RTD}), max(t_{RTD})) < (t_X + t_Y) \times t_{subframe}$.

Signed and Sealed this
Tenth Day of September, 2024

*Katherine Kelly Vidal*
Katherine Kelly Vidal
*Director of the United States Patent and Trademark Office*